May 17, 1938.  C. J. YOUNG  2,117,587
ELECTRICAL CONVERSION SYSTEM
Filed Jan. 31, 1935
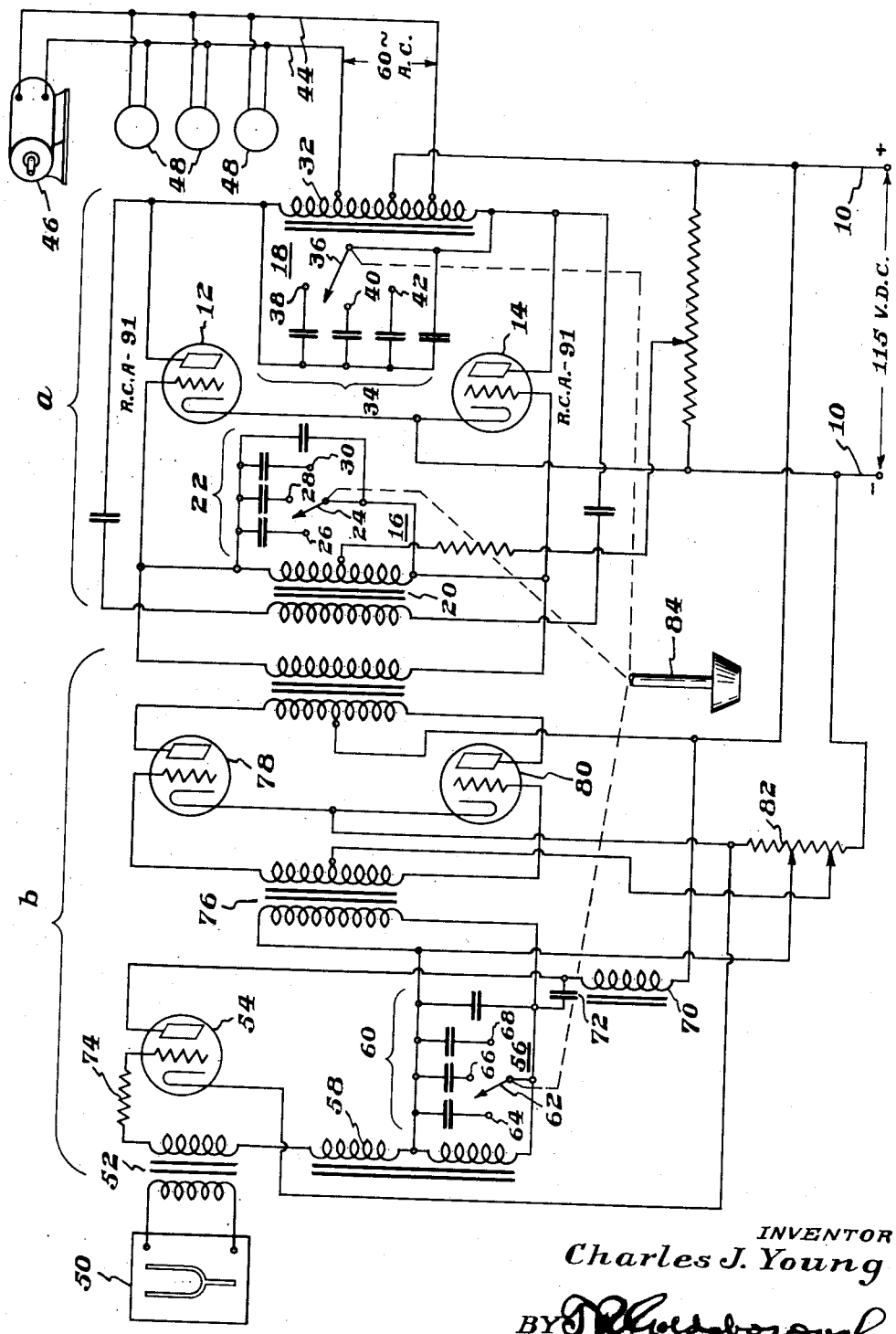
INVENTOR
Charles J. Young
BY
ATTORNEY Patented May 17, 1938

2,117,587

UNITED STATES PATENT OFFICE 2,117,587

ELECTRICAL CONVERSION SYSTEM

Charles J. Young, Haverford, Pa., assignor to Radio Corporation of America, a corporation of Delaware Application January 31, 1935, Serial No. 4,319

7 Claims. (Cl. 250—36)

My invention relates to improvements in electrical conversion systems and, more particularly, to a system for synchronizing motors with a definite control frequency.

My improved system is particularly adapted for facsimile work, systems for clock control, and similar devices wherein there is a rotating shaft to be locked in phase and in synchronism with a source of alternating current such as might be obtained under control of a constant tuning fork or a piezo-electric standard.

In the early development of facsimile, synchronism of the rotating shaft associated with or forming part of the receiver scanner was obtained by the so-called Hammond thermionic brake or similar circuit. The Hammond system comprised an alternator mounted on the shaft referred to, which acted as a variable load on the driving motor, variation of the load being controlled in accordance with the existing relation at any time between the alternator output frequency and an incoming control frequency from the transmitter. While this method was successful, it required a substantial surplus of power in the driving motor and the use of a specially designed alternator.

Another method for synchronization comprised the amplification of a control frequency to a power level sufficient to actually drive the rotating shaft of the receiver scanner by means of a synchronous motor. This method was not used extensively because it required excessively large vacuum tubes in the amplifier, and was correspondingly inefficient.

With the foregoing in mind, it is one of the objects of my invention to provide an improved electrical conversion system in which several hundred watts of synchronous power for a motor can be easily and efficiently obtained, without the necessity of using a surplus of power in the driving motor, or specially designed equipment such as an alternator or an amplifier comprising excessively large vacuum tubes.

Another object of my invention is to provide an improved system of the character referred to wherein provision is made for obtaining selectively several desired synchronous speeds of the driving motor without the employment of clutches, elaborate and costly gear boxes, or other mechanical devices, as heretofore.

Other objects and advantages will hereinafter appear.

In accordance with my invention, a grid controlled gaseous discharged inverter operates to drive a synchronous motor, the frequency of the inverter being controlled from a constant or reference A. C. voltage. Provision is made for tuning the various circuits in the system whereby the output frequency from the grid controlled gaseous discharge inverter can be changed selectively to obtain any one of several predetermined frequencies to change the speed of the driving motor accordingly.

My invention resides in the improved system and method of operation of the character hereinafter described and claimed.

For the purpose of illustrating my invention, an embodiment thereof is shown in the drawing, which is a simplified diagrammatic view of an electrical conversion system constructed and operating in accordance with my invention.

In the drawing, the parts and circuits under the bracket $a$ comprise a conventional grid controlled gaseous discharge inverter supplied with power from a 115 volt D. C. line 10. The inverter comprises a pair of grid controlled gaseous discharge inverter tubes 12 and 14 and tank circuits 16 and 18.

The tank circuit 16 operates as an excitation circuit for the tubes 12 and 14, and comprises a transformer 20 and an adjustable capacitor 22. The capacitor 22 is adjusted by a switch device 24 having the contacts 26, 28 and 30.

The tank circuit 18 is connected, as shown, to constitute the output circuit of the converter tubes, and comprises a reactor 32 and a variable capacitor 34. The capacitor 34 is adjusted by a switch device 36 having the contacts 38, 40 and 42.

In operation, the grid controlled gaseous discharge inverter apparatus operates to convert the direct current in the line 10 to alternating current which is taken from the reactor 32 by a supply line 44 which might supply a synchronous motor 46 for driving a facsimile receiver, synchronous electric clocks 48, or other like devices.

For the purpose of controlling the frequency of operation of the grid controlled gaseous discharge inverter, a conventional temperature-controlled tuning fork, designated by the reference numeral 50, operates to develop control signals at practically a constant frequency. A fork and the associated circuits which might be satisfactory for this purpose are disclosed in detail in Patent No. 1,937,583, issued December 5, 1933 to E. B. Norrman.

The parts and circuits under the bracket $b$ comprise a control amplifier for the inverter apparatus $a$.

The control signals from the fork device 50 are supplied by means of a transformer 52 to the grid of a tube 54. Considering a specific case, the tube 54 and a tank circuit 56, associated therewith, are adjusted to oscillate at approximately 60 cycles. The circuit 56 comprises a reactor 58 and a variable capacitor 60. The capacitor 60 is adjusted by a switch device 62 having the contacts 64, 66 and 68.

The reference numeral 70 designates a plate choke associated with the tube 54, 72 a feed-back capacitor, and 74 a grid-leak resistance. The tube 54 is in a normally oscillating condition due to the adjustment of its circuit constants.

Considering a specific case, the fork device 50 will be said to supply control signals at a constant rate of 480 per second, and the switch 62 will be considered as being on the contact 64, in which case adjustment is such that the tube 54 will oscillate at approximately 60 cycles. This tube, under control of the signals from the fork device 50, will maintain operation at exactly 60 cycles, that is, at one-eighth of the frequency of 480 cycles of operation of the fork device.

The 60-cycle voltage from the tube 54 is transferred by a transformer 76 to the grids of amplifier tubes 78 and 80, connected in push-pull.

The bias voltage on the tubes 54, 78 and 80 is taken from a resistance 82.

For simplicity, the heater circuits for the various tubes have not been shown.

With the switches 24 and 36 on the contacts 26 and 38, respectively, the grid controlled gaseous discharge is adjusted to oscillate at approximately 60 cycles, and, under control of the constant 60-cycle voltage supplied by the tubes 78 and 80, will oscillate or lock in at exactly 60 cycles. The motor 46, clocks 48, and any other similar devices which might be supplied from the line 44, will, therefore, operate in synchronism with the control frequency supplied by the fork device 50. That is, with the adjustments as specified, the voltage frequency in the line 44 will be one-eighth of the frequency of vibration of the tuning fork or other vibratory member of the frequency standard 50, and the motors supplied from the line 44 will, accordingly, run constantly at 1800 R. P. M.

When the switches 24, 36 and 62 are on the second taps 28, 40 and 66, respectively, the adjustments are such that the tubes 12, 14 and 54 will oscillate approximately at 80 cycles, that is, approximately at the sub-multiple of 6 of the fork frequency of 480 cycles. The tube 54, under control of the signals from the fork device 50, will be locked in for operation at exactly 80 cycles. The tubes 12 and 14, under control of the 80 cycle voltage from the tubes 78 and 80, will also be locked in for operation at exactly 80 cycles. The synchronous motors supplied from the line 44 will then operate constantly at 2400 R. P. M.

With the switches 24, 36 and 62 on the third contacts 30, 42 and 68, respectively, the tubes 12, 14 and 54 will be adjusted to oscillate approximately at 120 cycles, or at the sub-multiple 4 of the fork frequency of 480 cycles. Under control of the signals from the fork device 50, these tubes will be locked in for operation at exactly 120 cycles. The motors supplied from the line 44 will then operate constantly at a speed of exactly 3600 R. P. M.

Other divisions or sub-multiples of the constant frequency of operation of the standard 50 may be obtained by changing the adjustments, as will be well understood.

It is contemplated to actuate or adjust the switches 24, 36 and 62 from a common shaft 84, which arrangement gives the equivalent of the speed-change lever associated with the gear-boxes used heretofore for speed control in facsimile systems.

From the foregoing it will be seen that I have provided an improved electrical conversion system, by which one or more synchronous motors may be made to operate at different speeds, in synchronism with a frequency standard. A speed change is effected merely by adjustment of one or more electrical circuits, and without resource to clutches, gears, or other mechanical devices. My improved system makes possible the use of a clock control system comprising standard synchronous clocks, where only direct current power is available, such as in large buildings and aboard ship. That is, by my improved system it is possible to efficiently obtain a 60-cycle power supply of great constancy in places where only direct current power is available.

It will be understood that various modifications, within the conception of those skilled in the art, are possible without departing from the spirit of my invention or the scope of the claims.

I claim as my invention:

1. In an electrical conversion system, a pair of grid controlled gaseous discharge inverter tubes connected in push-pull relation and normally oscillating, means operable to oscillate at a definite frequency independently of operating action of said tubes to develop control signals, a circuit connected with said tubes for causing the same to operate substantially at a sub-multiple of said definite frequency, and means connecting said first-named means and said tubes and operating to supply the latter with said control signals.

2. In an electrical conversion system, grid controlled gaseous discharge electron inverter means for converting direct current to alternating current, an adjustable circuit connected with said means for causing the same to oscillate selectively at different frequencies, means operable to oscillate at a definite frequency independently of operating action of said inverter means to develop control signals, means connecting said oscillatory means and said inverter means to supply the latter with said signals, and means for adjusting said circuit to cause said inverter means to operate selectively at different desired sub-multiples of said definite frequency.

3. In an electrical conversion system, grid controlled gaseous discharge electron inverter means for converting direct current to alternating current, said means normally oscillating, means for producing electrical oscillations of fixed frequency independently of the operating action of said inverter means to develop control signals, means connecting said oscillatory means and said inverter means to supply the latter with said signals, a plurality of adjustable circuits connected respectively with said connecting means and said inverter means to control the frequency of operation thereof, and means common with respect to said circuits for adjusting the same to cause said inverter means to operate selectively at different desired sub-multiples of said definite frequency.

4. In an electrical conversion system, a source of control signals of substantially constant frequency, said source comprising a vibratory member having a natural period of vibration corresponding to said constant frequency, normally oscillating grid controlled gaseous discharge apparatus for converting direct current to alternating current, means for adjusting said apparatus to respond at a frequency which is substantially a sub-multiple of the frequency of vibration of said constant frequency, means interposed between said constant frequency source and said converter, means for supplying said control signals thereto, and a load circuit for utilizing the produced controlled alternating current.

5. In an electrical conversion system, a source of control signals of substantially constant frequency, said source comprising a vibratory member having a natural period of vibration corresponding to said frequency, normally oscillating grid controlled gaseous discharge apparatus for converting direct current to alternating current, a tuned circuit connected with said grid controlled gaseous discharge apparatus, means for adjusting the tuned circuit to approximately a sub-multiple of the frequency of vibration of said member and means interposed between said control means and said apparatus for supplying said apparatus with said control signals, and a load circuit to utilize the produced controlled alternating currents.

6. The method of converting direct current energy to alternating current energy of substantially constant frequency which comprises the steps of developing constant frequency energy, deriving energy of a sub-multiple frequency from said developed constant frequency energy, controlling a normally oscillating ionic discharge to produce alternating current energy from direct current energy, and controlling the frequency of the produced alternating current by the derived sub-multiple frequency energy.

7. In an electrical conversion system, a source of constant frequency energy, means for deriving sub-multiple frequency energy from said source, a push-pull normally oscillating grid-controlled gas discharge tube oscillator having an output circuit, means for controlling the frequency of said oscillator by the derived sub-multiple frequency energy, and means for simultaneously changing the sub-multiple derived energy and the natural period of the oscillator, which maintains control of the frequency of the energy in the output circuit of the oscillator.

CHARLES J. YOUNG.